June 28, 1966 B. H. HUMPHERYS 3,258,772
RADAR DEFRUITER
Filed Sept. 28, 1964
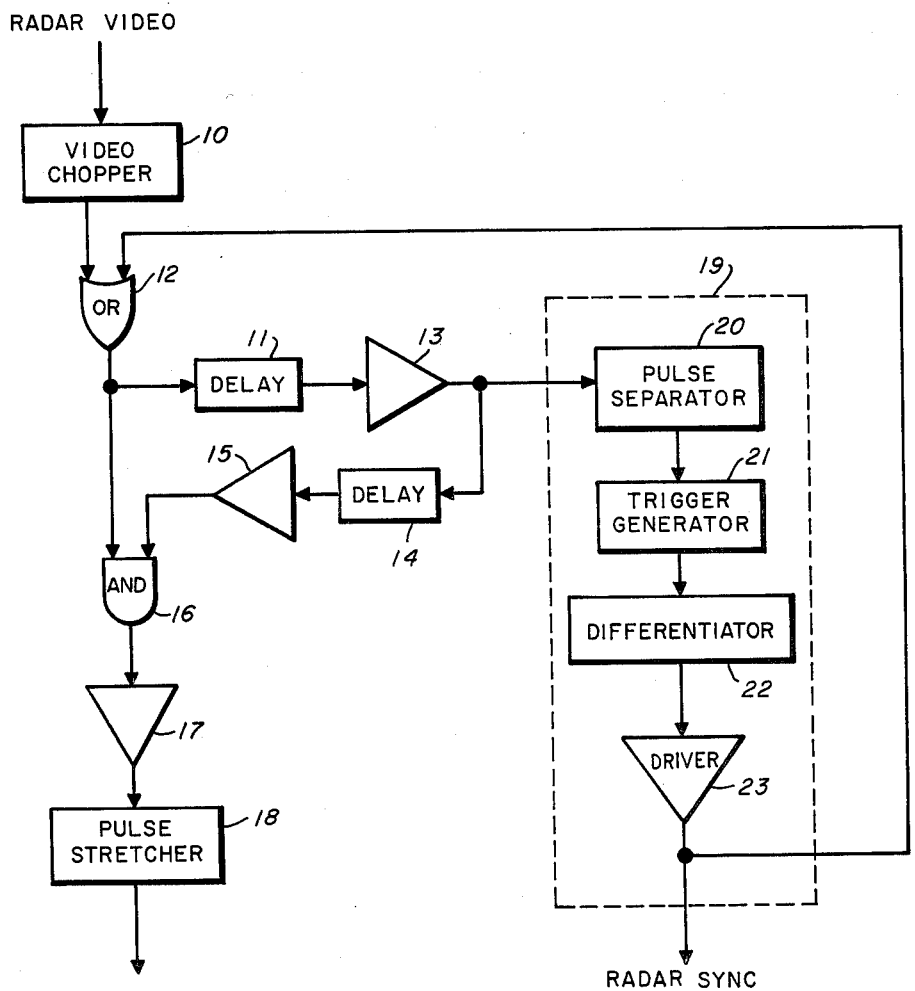
INVENTOR.
BERNARR H. HUMPHERYS
BY
ATTORNEYS

Header omitted

3,258,772
RADAR DEFRUITER
Bernarr H. Humpherys, 719 Goldenrod St., Escondido, Calif.
Filed Sept. 28, 1964, Ser. No. 399,948
5 Claims. (Cl. 343—17.1)

The invention described herein may be manufactured and used by or for the Government of the United States of America for governmental purposes without the payment of any royalties thereon or therefor.

The present invention relates to a system for reducing the adverse effects of interference on a radar display and more particularly, to a system for rejecting non-synchronous replies in a radar system and specifically, to a system for rejecting non-synchronous replies and improving the signal-to-noise ratio in a radar system.

A fundamental requirement of a radar system is that it have the ability to gain reliable information under adverse conditions. To illustrate this situation, consider a case where many radar and associated IFF responsers are in operation. The radar replies as well as the returns from the IFF responsers generate interference. The interference generated by the system itself is not synchronous and is commonly referred to as "fruit." Under such conditions, even the most simple type of display may become confused and the radar replies ambiguous.

Attempts have been made to solve this problem, however, none have been fully effective and, in addition, entail the use of expensive, complicated equipment which is difficult to maintain and service.

An object of the present invention is to provide a practical low-cost easy to construct system for reducing the adverse effects of electronic interference in a radar system.

An additional object of the invention is to provide a system for removing unsynchronized replies from the radar system and improving the signal-to-noise ratio.

Other objects and advantages will become apparent after study with respect to the figure which illustrates a preferred embodiment of the invention.

In the system as set forth in the figure, radar video is coupled in to a pulse chopper 10 and the output of the chopper is coupled as one input to an OR gate 12. The other input to OR gate 12 comprises the output of a synchronizer contained within the dotted line 19.

The output of the OR gate 12 is coupled as an input to delay line 11 which is a conventional magnetostrictive delay line, and may have a plurality of output taps so that the repetition rate of the associated radar may be matched. It should be noted that since a magnetostrictive delay line is desired, because of its relatively low cost, the input video pulses have to be chopped into pulse lengths which can be accommodated by such a line. The length of pulses from the chopper must therefore equal the length of pulses which the line is designed to accommodate.

The output of the delay line is coupled through an amplifier 13 to another delay line 14, a short one which is used to adjust for circuit delays. The output of delay line 14 is coupled through another amplifier 15 as one input to AND gate 16. The other input to AND gate 16 comprises the output of the OR gate 12. The output of AND gate 16 is coupled through amplifier 17 and, if necessary, through a pulse stretcher 18.

The output of the AND gate 16 which is coupled through the amplifier 17 constitutes chopped "defruited" radar while the output of the pulse stretcher constitutes almost an exact replica of the radar video which is coupled into the video chopper 10.

It is necessary to synchronize the "defruiter" with the associated radar system. In order to do this, the output of amplifier 13 is coupled to a pulse separator 20 the output of which is coupled through a trigger generator 21 and differentiator 22 to an amplifier 23. The output of the amplifier 23 constitutes an output which is coupled back to the input of OR gate 12 and also constitutes the radar synchronization pulse.

The pulse separator comprises an amplifier clipper so that the output of the pulse separator 20 contains the synchronization pulse only. Single pulse outputs are used to trigger the trigger generator 21, in turn is coupled to the differentiator 22 which is used to produce a sharp spike at the trailing edge of the pulses from the trigger generator 21. The trigger generator may be a simple multivibrator, however, any free running trigger generator may be used.

The output of the differentiator 22 is coupled through the amplifier 23 to the input of the OR gate 12 to provide a recycling so that the system is self-sustaining and provides a continuous clock pulse output.

In the operation of the system as set forth, radar video is coupled to the input of the chopper 10. The chopper functions to preserve the level of the video input and produces a series of pulses at its output which are determined by the length of the input pulse and the circuitry of the chopper. The chopper is set forth and disclosed in copending application Serial No. 399,947, filed September 28, 1964. The output of the chopper 10 is coupled to delay line 11 after being buffered through OR gate 12.

The pulses are delayed one period, i.e., the time of one repetition period of the associated radar system, amplified in amplifier 13, and coupled through a delay line 14 and amplifier 15 to the input of AND gate 16. The other input to AND gate 16 comprises the output of OR gate 12.

Delayed pulses are coincidized against the output of OR gate 12 and, if in coincidence an output from AND gate 16 results.

The output of AND gate 16 is coupled through an amplifier 17 to a pulse stretcher 18 if needed or desired. The pulse stretcher may be used to fill in the intervals between pulses resulting from the chopping if this is objectionable on the display. However, in operation, no difference is noted on the radar scope until the ten mile range is approached.

Through the use of the invention, only synchronous replies show up on the radar screen. In this manner, asynchronous replies or "fruit" do no show up on the radar display.

Obviously many modifications and variations of the present invention are possible in the light of the above teachings. It is therefore to be understood that within the scope of the appended claims the invention may be practiced otheerwise than as specifically described.

What is claimed is:
1. A radar defruiter comprising:
   pulse chopping means for receiving an input video signal and chopping the video signal while preserving the amplitude of the signal;
   said pulse chopping means having an output;
   delay means operatively receiving the output of the pulse chopping means for delaying the output of said pulse chopping means by at least one repetition rate of an associated radar system;
   coincidizing means having inputs and an output;
   one input to said coincidizing means being operatively connected to and receiving the output from said pulse chopping means;
   another input to said coincidizing means being operatively connected to and receiving the output from said delay means;
   said coincidizing means producing output pulses when inputs from said pulse chopping means and said delay means are present at the inputs simultaneously;

the output from said coincidizing means constituting defruited radar video.

2. A radar defruiter as set forth in claim 1 and further including;

pulse stretcher means connected to the output of said coincidizing means for stretching the output pulses from said coincidizing means so that the output from said pulse stretcher is a close approximation of the video signal input.

3. A system for improving the signal-to-noise ratio and removing electronic interference in a radar system comprising;

pulse chopping means for receiving a video input and chopping the video input into a series of regularly repeating pulses;

delay means operatively coupled to the output of said pulse chopper means for delaying the pulse chopper output at least one repetition period of the associated radar system;

coincidizing means having inputs and an output;

one of said inputs operatively receiving an output from said pulse chopper means;

another input to said coincidizing means comprising the output of said delay means;

said coincidizing means producing an output when pulses from said chopping means and said delay means are coincident simultaneously at the inputs;

the output from said coincidizing means constituting synchronous replies to the associated radar system.

4. A system as set forth in claim 3 and further including:

pulse stretching means operatively connected to the output of said coincidizing means for stretching the output of said coincidizing means to approximate the video input.

5. A system as set forth in claim 4 and further including:

synchronizing means operatively connected to the output of said delay means;

said synchronizing means having an output;

said output being connected to the associated radar system for synchronizing the system for removing the synchronous replies with the associated radar system.

No references cited.

LEWIS H. MYERS, *Primary Examiner.*

CHESTER L. JUSTUS, *Examiner.*

R. D. BENNETT, *Assistant Examiner.*